United States Patent
Kuhn

[11] 3,917,364
[45] Nov. 4, 1975

[54] VERTICAL THRUST BEARING LUBRICANT SEAL

[75] Inventor: Earl C. Kuhn, Verona, Pa.

[73] Assignee: Westinghouse Electric Corporation, Pittsburgh, Pa.

[22] Filed: Jan. 22, 1974

[21] Appl. No.: 435,547

[52] U.S. Cl. .................. 308/36.1; 308/73; 308/76; 308/134.1; 308/160
[51] Int. Cl.². F16C 1/24; F16C 33/72; F16J 15/00; F16J 15/54
[58] Field of Search ...... 308/73, 76, 77, 122, 134.1, 308/160, 170, 36.1

[56] References Cited
UNITED STATES PATENTS

| | | | |
|---|---|---|---|
| 1,792,719 | 2/1931 | White | 308/160 |
| 2,906,570 | 9/1959 | Nenicka et al. | 308/76 |
| 3,160,450 | 12/1964 | Gentiluomo | 308/160 |
| 3,814,487 | 6/1974 | Gardner | 308/160 |

*Primary Examiner*—M. Henson Wood, Jr.
*Assistant Examiner*—Howard Beltran
*Attorney, Agent, or Firm*—G. H. Telfer

[57] ABSTRACT

A large vertical thrust bearing is provided of the type in which a thrust runner on the shaft is supported on bearing pads in an annular oil reservoir. In order to prevent free surface turbulence and aeration of the oil, an annular seal member is provided in the space between the thrust runner and the inner wall of the oil reservoir. The seal is an annular member of lower density than the oil which floats freely on the surface of the oil with no contact between the seal member and either the reservoir wall or the thrust runner.

5 Claims, 1 Drawing Figure

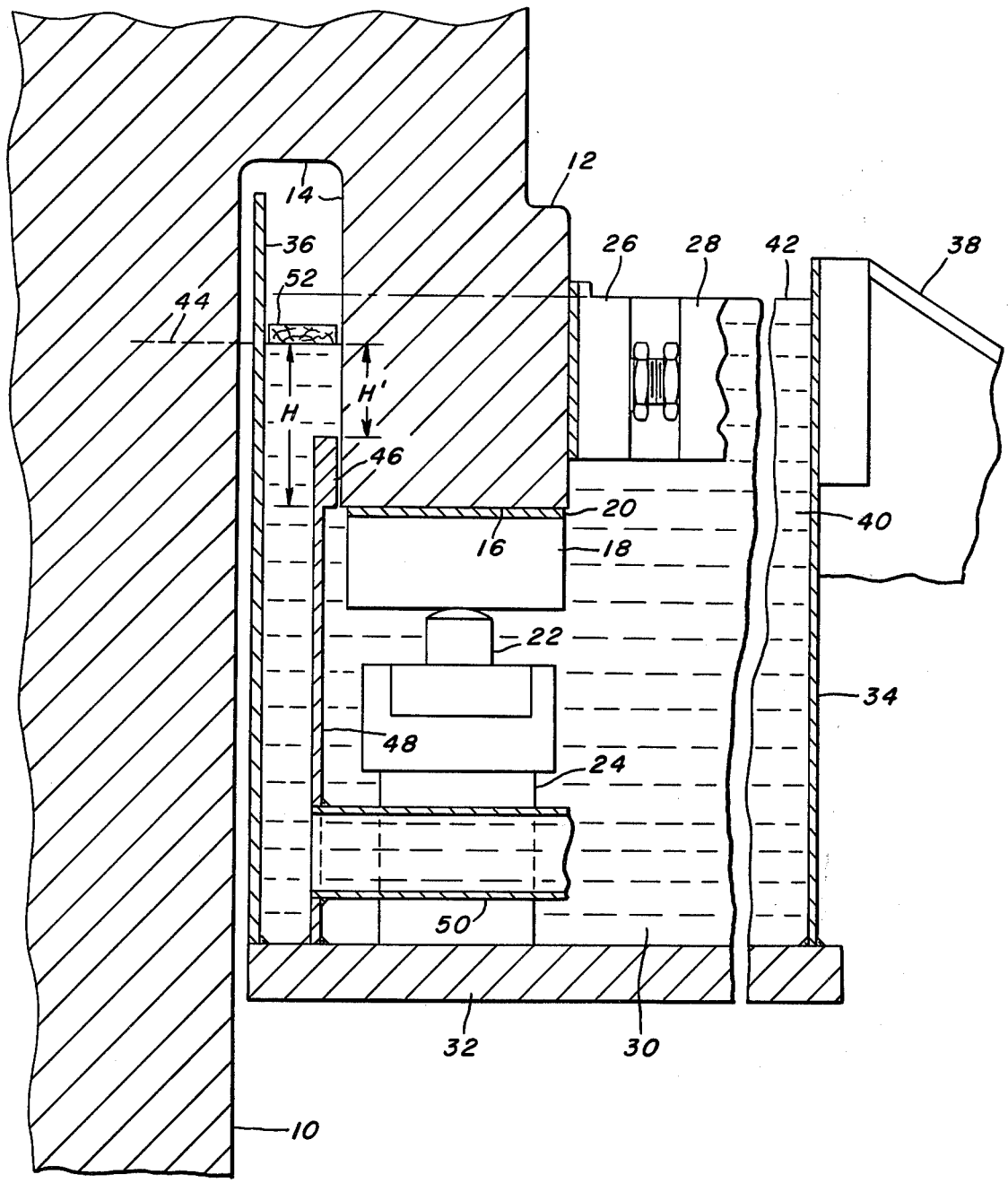

VERTICAL THRUST BEARING LUBRICANT SEAL

BACKGROUND OF THE INVENTION

The present invention relates to large thrust bearings for vertical shafts, and more particularly to sealing means for such bearings for preventing free surface turbulence and aeration of the lubricating oil.

Large vertical rotating machines, such as electric motors and generators, require large thrust bearings to support the vertical rotating shaft and the elements carried thereby. In one usual arrangement, the shaft carries a thrust runner which encircles the shaft with an annular clearance space between the thrust runner and the shaft. The thrust runner has a horizontal bearing surface and is supported on a bearing consisting of a plurality of pivoted bearing pads disposed in a circular arrangement around the shaft. The entire bearing assembly is contained in a generally annular oil reservoir, or oil pot, which has an outer cylindrical wall on the outside of the thrust runner and inner cylindrical wall extending up into the clearance space between the thrust runner and the shaft. The oil reservoir is filled with oil or other liquid lubricant up to a level above the bearing surfaces, and in operation a hydrodynamic oil film is formed between the thrust runner and each of the bearing pad surfaces to support the weight of the rotating parts. During rotation of the thrust runner, the oil is caused to circulate in the reservoir and through and between the bearing pads, thus maintaining a continuous supply of oil at the inlet of the oil films.

This type of bearing has been very satisfactory in service and has been extensively used for large vertical rotating machines. In some cases, however, especially with bearings of large size or high speed, certain difficulties have been encountered. Under some conditions, the oil in the annular space between the thrust runner and the inner wall of the oil reservoir may become violently turbulent, causing the oil to overflow with substantial loss of oil, and excessive aeration of the oil may occur with entrainment of air bubbles resulting in serious impairment of the lubrication. It has been attempted to overcome these problems by the use of a so-called laminar seal consisting of a cylindrical sealing member or ring disposed in the space between the thrust runner and the oil reservoir wall and having a small clearance with the thrust runner such that a solid film of oil is maintained in this clearance under laminar flow conditions. This type of seal has been effective in some cases, but in many cases turbulence and aeration may still occur even when a laminar seal is used.

SUMMARY OF THE INVENTION

The present invention provides a seal for large thrust bearings of the type described above which effectively prevents the occurrence of free surface turbulence and aeration in oil in the clearance space between the thrust runner and the inner wall of the oil reservoir. For this purpose, an annular seal member is provided which may, for example, be a wooden ring, or a ring of any material of lower density than the oil, which floats on the surface of the oil in the space between the oil reservoir wall and the thrust runner. The seal ring has a small clearance on each side, between its outer edge and the wall of the oil reservoir, and between the inner edge of the ring and the thrust runner, so that the ring is not restrained and floats freely on the surface of the oil but is of such size as to cover the surface of the oil and keep the surface of the oil substantially free of vertical motions. The seal ring may be used either alone or in combination with a laminar seal such as described above, and effectively prevents the occurrence of turbulence or aeration of the oil in the annular clearance space, thus overcoming the problems discussed above.

BRIEF DESCRIPTION OF THE DRAWING

The invention will be more fully understood from the following detailed description, taken in connection with the accompanying drawing, in which the single figure is a vertical sectional view of a thrust bearing assembly embodying the invention.

DESCRIPTION OF THE PREFERRED EMBODIMENT

The invention is shown in the drawing embodied in a large thrust bearing of typical construction for supporting a vertical shaft. As there shown, the shaft 10 has a thrust runner or thrust block 12 which may be integral with the shaft or rigidly secured to it in any suitable manner. The thrust runner 12 surrounds the shaft 10 as shown with an annular clearance space 14 between the shaft and the thrust runner. The thrust runner 12 has a horizontal bearing surface 16 at its lower end which encircles the shaft and is of sufficient area to support the weight of the shaft 10 and of the rotating parts carried by the shaft. The thrust runner 12 may be supported on bearing means of any suitable type. As shown, the bearing consists of a plurality of pivotally mounted bearing pads or shoes 18 of usual type which are disposed in a circular array extending around the shaft. Each of the bearing pads 18 has a bearing surface 20 of suitable bearing material engaging the bearing surface 16 and is pivotally supported on a pivot indicated at 22 which, in turn, is carried on a supporting structure 24 of any suitable type. This type of bearing is well known and is to be taken as representative of any suitable bearing means on which the thrust runner 12 may be supported. It is usual in the design of such bearing assemblies to incorporate guide bearings for lateral support of the shaft, and guide bearing shoes 26 may be provided as shown engaging a cylindrical bearing surface on the outer surface of the thrust runner 12. The guide bearing shoes 26 are disposed in a circular array around the shaft and may be of any suitable type and supported in any desired manner as generally indicated at 28.

The entire bearing assembly is contained in a generally annular oil reservoir or oil pot 30 in the usual manner. As shown in the drawing, the oil reservoir 30 has a generally annular bottom member 32 and has a cylindrical outer wall 34 and a cylindrical inner wall 36. The inner and outer walls are attached in any desired manner to the bottom member 32, and the entire oil reservoir is supported on any suitable supporting structure, generally indicated at 38, in the position shown such that the inner wall 36 extends up into the clearance space 14 between the shaft 10 and the thrust runner 12. The oil reservoir is filled with a liquid lubricant 40 which is preferably oil although any suitable lubricant could be used. The reservoir 30 is filled with lubricant up to a level such as is indicated at 42 where the bearing members are completely submerged in the oil. During operation, the oil level may lower to some level such as that indicated at 44, but in normal operation, the bearing means should be submerged in the lubricant. The oil reservoir 30 is made of sufficient size to accommodate the bearing members, including the guide bearings and the necessary supports, and any other usual or desired equipment such as conventional cooling coils for removing heat from the oil.

In normal operation, rotation of the thrust runner 12 causes circulation of the oil in the reservoir 30 such that the oil flows generally radially outward through and between the bearing shoes 18 and both radially and circumferentially in the upper part of the reservoir, return flow occurring in the lower part of the reservoir. This circulation provides a continuous supply of lubricant to the bearing surfaces of the pads to maintain the required hydrodynamic oil film on which the thrust runner is supported and this type of bearing lubrication is normally very satisfactory. In some cases, however, especially with bearings of large size or high speed, certain difficulties are encountered. It will be seen that the volume of oil in the annular clearance space between the thrust runner 12 and the inner wall 36 of the oil reservoir is quite small as compared to the total volume of oil in the oil reservoir. This small volume of oil is contained between the stationary wall 36 and the cylindrical inner surface of the rotating thrust runner 12 and rotates at approximately half the peripheral velocity of the thrust runner. Under some operating conditions, the flow of oil in this space changes from the normal condition of laminar flow to a condition of turbulent flow in which very violent turbulence can occur, resulting frequently in overflow of the oil over the inner reservoir wall 36. In addition, excessive aeration of the oil may occur causing the build-up of a thick layer of foam on top of the oil and resulting in further overflow and loss of oil. Such aeration of the oil is extremely undesirable as the oil continues to circulate and carries entrained air bubbles into the main body of oil in the oil reservoir with severe impairment of the bearing lubrication.

The conditions under which this turbulence of the oil occurs are determined by the Reynolds number, which is a function of the peripheral velocity of the inner surface of the thrust runner and of the radial clearance between the thrust runner and the stationary wall 36 of the oil reservoir, and an inverse function of the viscosity of the lubricant. When a certain critical value of the Reynolds number is exceeded, the oil flow changes suddenly from a laminar condition to the violently turbulent condition described above in which overflow and aeration of the oil may occur. The turbulent overflow of oil over the oil reservoir wall 36 results in leakage of oil along the shaft with possible damage or other undesirable effects on other associated apparatus, as well as a substantial loss of oil. The excessive aeration of the oil referred to above is also extremely undesirable because of its adverse effects on the bearing lubrication and because the piling up of foaming oil upon the surface causes further loss of oil by overflow.

It has been attempted to prevent the occurrence of these conditions by means of a so-called laminar seal. Such a seal of typical arrangement is shown in the drawing and may comprise a generally cylindrical seal member or ring 46 supported in any suitable manner, as by a cylindrical supporting wall 48. The seal ring 46 is positioned close to the cylindrical inner surface of the thrust runner 12 with a small clearance such that normally a solid film of oil is maintained under laminar flow conditions in this clearance, which is made small enough to keep the Reynolds number below the critical value. Such seals have been found to be effective in many cases but their effectiveness depends on the maintenance of a sufficient volume of oil above the seal ring to maintain the desired flow through the clearance and it has been found that the turbulent flow conditions described above can cause aeration of the oil even with a laminar seal.

Under normal conditions, the pumping action of the thrust runner 12 maintains a generally radial flow of oil through the bearing pads 18 with return flow at the bottom of the oil reservoir either by free circulation or through one or more conduits 50 from the oil reservoir itself or from an external pressurized source. In normal flow, this return flow replaces the oil flowing radially outward through the bearing pads. The oil level indicated at 44 is thus maintained, and the pressure at the lower surface 16 of the thrust runner 12 will be equal to the head of oil indicated at H if no laminar seal 46 is used. If such a seal is used, the corresponding pressure is equivalent to the head of oil indicated at H' plus the pressure drop through the clearance between the seal 46 and the thrust runner. This oil pressure is normally sufficient to maintain the desired oil flow through the laminar seal. Under the conditions of excessive turbulence described above, however, it is possible for the head of oil H or H' to be reduced to effectively zero or below so that the pressure adjacent the surface 16 of the thrust runner falls to atmospheric or subatmospheric pressure. This, of course, destroys the effectiveness of any laminar seal that may be provided as well as aggravating the condition and effectively promoting the highly undesirable aeration of the oil.

In accordance with the present invention, the excessive turbulence and aeration described above are prevented by means of a seal member 52. The seal 52 is an annular member resting on the surface of the oil in the annular space between the inner surface of the thrust runner 12 and the inner wall 36 of the oil reservoir. The seal ring 52 is designed to have a very small clearance between its inner circumference and the inner wall 36 of the oil reservoir, and a very small clearance between its outer circumference and the adjacent inner surface of the thrust runner. Thus, the ring 52 is free of contact with either of the adjacent walls and floats freely on the surface of the oil while substantially covering the surface. The seal ring 52 is preferably made of wood, such as Marine grade plywood, but any material of lower density than the oil may be used. Since the wall 36 is stationary and the thrust runner 12 rotates, the oil in the space between them tends to rotate and the ring 52 will rotate at approximately half the peripheral speed of the adjacent thrust runner surface. This rotation of the ring is due to the fact that it is free to move in the annular clearance space with no restraints and minimizes any losses due to the presence of the ring since it can move with the oil. The presence of the ring 52 effectively prevents the excessive turbulence described above and thus prevents overflow of oil over the inner wall 36. Since the ring is free to float on the oil, the oil in the annular clearance is always enclosed and its surface substantially sealed so that aeration of the oil is substantially prevented as long as some level of oil is maintained above the level of the bearing surface. Normal variations in the oil level 44 such as may be caused by changes in speed of the shaft are thus accommodated with no adverse effects as the seal ring moves up or down with the oil level.

The seal ring 52 may be used either with or without a laminar seal 46. When used without such a seal, the presence of the ring 52 in itself prevents free surface turbulence and tends to prevent aeration by enclosing the oil so that a substantial seal is maintained over the surface of the oil, preventing the entrainment of air bubbles in the oil. When used with a laminar seal 46, the presence of the seal ring 52 increases the effectiveness of the laminar seal since, in effect, it insures that a sufficient head of non-aerated oil H' is maintained above the seal 46 to maintain the required flow through the seal clearance. In the absence of the ring 52, as explained above, turbulence can occur such as to reduce the head H' to essentially zero, thus destroying the effectiveness of the laminar seal. The seal ring 52 prevents the occurrence of such conditions.

It will now be apparent that a sealing means has been provided for large thrust bearings which effectively prevents the occurrence of excessive turbulence and aeration of the oil in the annular clearance between the oil reservoir wall and the thrust runner. This result is obtained in a simple and inexpensive manner by means of the seal ring 52 floating on the oil surface which substantially eliminates the problem. It will be understood that although a specific structure has been shown for the purpose of illustration, the invention is applicable to any thrust bearing of the general type described. The seal ring may be used either with or without a laminar seal, and may be of any suitable material or configuration that will function in the manner described.

What is claimed is:

1. In a thrust bearing assembly for a vertical shaft having a thrust runner encircling the shaft with an annular space therebetween, bearing means engaging the thrust runner for supporting the shaft, a lubricant reservoir containing said bearing means, said reservoir having an inner cylindrical wall extending between and spared from the shaft and the thrust runner and an outer cylindrical wall outside of the thrust runner, liquid lubricant filling the reservoir to a level above the bearing means, a cylindrical seal member extending circumferentially around the thrust runner in the space between the thrust runner and said inner wall below the normal level of the lubricant, said cylindrical seal member having a close clearance with the thrust runner such that lubricant flow through the clearance is laminar under normal operating conditions and an annular seal member resting on the surface of the lubricant in the space between said inner wall and the thrust runner and substantially covering said surface.

2. The combination of claim 1 in which said seal member is free of contact with both the inner wall and the thrust runner.

3. The combination of claim 2 in which said seal member is made of a material of lower density than the liquid lubricant and floats freely on the surface of the lubricant.

4. The combination of claim 3 in which the seal member is made of wood and the liquid is oil.

5. The combination of claim 1 in which the annular seal member floats freely on the surface of the lubricant.

* * * * *